United States Patent [19]

Moschovis et al.

[11] Patent Number: 4,782,129
[45] Date of Patent: Nov. 1, 1988

[54] ACRYLATED POLYURETHANES BASED ON POLYOXYTETRAMETHYLENE GLYCOL CHAIN EXTENDED WITH SUBSTITUTED DIACIDS

[75] Inventors: Elias P. Moschovis, Morton Grove; Joseph J. Stanton, Buffalo Grove; Clive J. Coady, Hanover Park, all of Ill.

[73] Assignee: DeSoto, Inc., Des Plaines, Ill.

[21] Appl. No.: 140,726

[22] Filed: Jan. 4, 1988

[51] Int. Cl.[4] .............................................. C08G 18/04
[52] U.S. Cl. ...................................... 528/49; 525/242; 525/279; 525/298; 526/263; 526/301; 528/66
[58] Field of Search ............................. 528/49, 66, 75; 204/157.82; 525/242, 279, 298; 526/263, 301

[56] References Cited

U.S. PATENT DOCUMENTS 4,629,287 12/1986 Bishop ................................... 528/75

Primary Examiner—Maurice J. Welsh
Attorney, Agent, or Firm—Dressler, Goldsmith, Shore, Sutker & Milnamow, Ltd.

[57] ABSTRACT

An ultraviolet-curable coating composition adapted for the buffer coating of optical glass fiber consists essentially of an acrylate-capped polyurethane in admixture with at least about 25% of its weight of liquid monoethylenically unsaturated monomer having a low glass transition temperature below about 0° C. The acrylate-capped polyurethane is based on a generally linear polyurethane which is the reaction product of organic diisocyanate with a stoichiometric deficiency of a modified diol, this modified diol being the diester reaction product of polyoxytetramethylene glycol having a molecular weight of from about 200 to about 2000 with a stoichiometric deficiency of a long chain ester-forming hydrocarbon-substituted dicarboxylic acid or ester-forming substitution product thereof. This provides a higher molecular weight polyoxytetramethylene glycol which includes ester groups and a long chain hydrocarbon substituent to improve microbending resistance while taking advantage of the better water resistance provided by the polyoxytetramethylene glycol component.

19 Claims, No Drawings

ACRYLATED POLYURETHANES BASED ON POLYOXYTETRAMETHYLENE GLYCOL CHAIN EXTENDED WITH SUBSTITUTED DIACIDS

DESCRIPTION

1. Technical Field

This invention relates to acrylated polyurethanes based on polyoxytetramethylene glycols which are chain extended with a substituted dicarboxylic acid, in order to minimize the crystallinity which characterizes such polyurethanes.

2. Background Art

Acrylated polyurethanes are well known for use in the buffer coating of optical glass fiber. These polyurethanes are typically formed by reacting polyoxyalkylene ether glycols with organic diisocyanates to form isocyanate-terminated polyurethanes which are capped with a monohydric acrylate, such as 2-hydroxyethyl acrylate. Various polyoxyalkylene ether glycols can be used, and it is preferred to employ those in which the repeating unit is a tetramethylene ether group (derived by reacting a polyoxytetramethylene glycol with the diisocyanate) because the tetramethylene ether group is more resistant to water than the corresponding ethylene ether or propylene ether group.

Unfortunately, the use of polyoxytetramethylene glycol introduces undesired crystallinity which causes the coatings to become harder and less flexible when low service temperatures are encountered. This crystallinity need only pervade portions of the coating in order to cause difficulty. This leads to microbending difficulties which are unacceptable. Thus, it is desired to take advantage of the superior water resistance conferred through the use of polyoxytetramethylene glycol, but this opportunity is limited by the undesired crystallinity it introduces.

DISCLOSURE OF INVENTION

In accordance with this invention, an ultraviolet-curable coating composition adapted for the buffer coating of optical glass fiber consists essentially of an acrylate-capped polyurethane, which may contain urea groups, in admixture with at least about 25% of the weight of the acrylate-capped polyurethane of liquid monoethylenically monomer having a low glass transition temperature below about 0° C. to provide a low modulus of elasticity at low service temperature. At least about 3% of the weight of the low glass transition temperature monomer of N-vinyl pyrrolidone is also preferably present.

The acrylate-capped polyurethane is based on a generally linear polyurethane which is the reaction product of organic diisocyanate with a stoichiometric deficiency of a modified diol, this modified diol being the diester reaction product of polyoxytetramethylene glycol with a stoichiometric deficiency of an ester-forming long chain saturated hydrocarbon-substituted dicarboxylic acid substitution product to provide a higher molecular weight polyoxytetramethylene glycol which includes ester groups and a long chain hydrocarbon substituent. This hydrocarbon substituent may be saturated or unsaturated.

A liquid linear aliphatic diacrylate in which the two acrylate groups are separated by a chain of at least six carbon atoms or a molecular weight of from about 400 to about 4000 may also be present, as shown in U.S. Pat. No. 4,629,287 to T. E. Bishop, in an amount of 5% to 30%, preferably from 10% to 25% of the weight of the composition to help provide good low temperature properties and good water resistance. The liquid diacrylate component is optional and can be omitted.

As a result of the use of the modified glycol having higher molecular weight and ester groups and providing a long chain hydrocarbon substituent to complex the polyoxytetramethylene repeating units, the crystallinity of ultraviolet-cured coatings is minimized. The result is greater water resistance combined with superior low temperature microbending resistance. Moreover, these important characteristics are achieved using a composition which cures rapidly on ultraviolet exposure, and this is a further feature of this contribution.

The long chain hydrocarbon group on the succinic acid or anhydride which is used herein may vary in chain length from 6 carbon atoms to a molecular weight of about 1000, but preferably does not exceed 22 carbon atoms. In best present practice, the hydrocarbon group contains from 8 to 16 carbon atoms and is ethylenically unsaturated. These will be illustrated herein using the dodecenyl group.

While the hydrocarbon group may be saturated or ethylencially unsaturated, the unsaturated group is preferred, in which case the presence of N-vinyl pyrrolidone enhances copolymerization which is preferred for best properties.

The saturated dicarboxylic acid is desirably succinic acid or adipic acid, but other similar acids or their anhydrides can be used. Succinic acid is preferred, and it matters little whether it is used in the acid or anhydride form. Indeed, dimethyl succinate can be used and the desired diester formed by removal of methanol instead of the removal of water. The stoichiometric deficiency of the dicarboxylic acid or anhydride is defined as a molar ratio of from about 0.3 to about 0.8 mole of the unsaturated acid or anhydride per mole of the polyoxytetramethylene glycol. The preferred molar ratio is from 0.5 to 0.7 mole of the hydrocarbon-substituted saturated acid or anhydride per mole of the polyoxytetramethylene glycol.

The proportion of low glass transition temperature monomer is desirably from 25% to 125%, preferably from 30% to 75%, and most preferably from 35% to 60%, based on the weight of the polyacrylate-terminated polyurethane. Larger proportions of the low glass transition temperature monomer will be used when the liquid diacrylate component is absent, up to about 120% of the weight of the polyacrylate-terminated polyurethane. This monoethylenically unsaturated liquid component helps to provide the low modulus needed for buffer coating optical glass fiber, and it also helps to provide the coating composition with a viscosity suitable for coating application. These aspects of this invention are themselves well known.

The liquid diacrylates which are also preferably present are more fully discussed in the said Bishop patent and are illustrated herein by $C_{14-15}$ diol diacrylates which are typified by the commercial product Chemlink 2000 available from Sartomer Company, West Chester Pa. Polyoxybutylene glycol diacrylate having a molecular weight of 1150 will further illustrate the useful materials of this type.

It is preferred that the N-vinyl pyrrolidone constitute from 5% to 30% of the low glass transition temperature monoethylenically unsaturated liquid component, preferably from 7% to 15%.

Polyacrylate-terminated polyurethanes are known to be made from a diol component, a diisocyanate component and a monohydric acrylate capping agent which is used to cap the isocyanate-terminated linear oligomer. The monohydric acrylate is usually a monoacrylate, such as 2-hydroxyethyl acrylate, and this provides diacrylate-terminated polyurethanes. On the other hand, monohydric polyacrylates, such as pentaerythritol triacrylate, are also useful and they provide a plurality of acrylate groups at each end of the linear oligomer.

While the modified diol which has been described hereinbefore is preferably the only difunctional component used other than the diisocyanate, it is permissible to include small proportions of other diols or diamines, such as 1,6-hexane diol or 1,6-hexane diamine, (which introduces some urea groups to enhance the physical strength of the coatings).

A small proportion of trifunctional reactant, up to about 10% of the total weight of difunctional reactants in the polyurethane, can be used, such as trimethylol propane, to provide limited branching in the linear polyurethane oligomer which is used herein, but this is usually not employed.

Any organic diisocyanate can be used, such as toluene diisocyanate or isophorone diisocyanate, but this component is no different herein than in the prior art, sot he full range of organic diisocyanates are useful, including diisocyanates in which a linear aliphatic chain containing at least 6 carbon atoms separates the two isocyanate groups, such as dimer fatty acid diisocyanates, are used to further enhance low temperature flexibility.

The compositions of this invention normally are to have an index of refraction of about 1.54–1.55, and possess a tensile modulus which enables microbending difficulties to be avoided down to around −60° C.

The polyoxytetramethylene glycol which is modified per this invention may have a molecular weight of from about 200 up to about 2000, and these will be illustrated herein by a polyoxytetramethylene glycol of molecular weight 100.

When a small proportion of other difunctional material (up to about 10 percent of total diol) is used, these are illustrated by 1,4-butane diol, 1,6-hexane diol, or the like. A suitable diamine which may be used in the same small proportion is 1,6-hexane diamine or, preferably, a diamino polyether such as polyoxypropylene diamine having a molecular weight of from about 200 to about 2000.

A corresponding small proportion of dihydroxy-functional polyesters (up to about 10% of total difunctional isocyanate-reactive material) are also useful, and these are illustrated by polycaprolactone glycols, such as the commercially available Tone 0240 from Union Carbide Corporation which is a polycaprolactone glycol having a molecular weight of about 2000.

The molecular weights herein are calculated from the reactivity of the compounds based on their theoretical formulas.

The reaction between the previously described diisocyanate, which is used in a stoichiometric excess of about one mole of diisocyanate per hydroxy group, and the diol forms a polyurethane diisocyanate. When somewhat higher molecular weight oligomers are desired, the excess of diisocyanate can be somethat less than one mol thereof per hydroxy group.

The polyurethane oligomers are usually linear oligomers which are isocyanate-terminated and are end capped with an hydroxy acrylate, such as a $C_2$ to $C_4$ hydroxyalkyl acrylate. These are typified by the preferred 2-hydroxyethyl acrylate, but the corresponding hydroxy esters formed from propylene oxide or butylene oxide can replace the 2-hydroxyethyl acrylate which is formed by the reaction of ethylene oxide and acrylic acid.

The production of the capped polyacrylate polyurethane is conventional and is subject to considerable variation from the standpoint of the order of reaction, as is also well known.

The low glass transition temperature monomer is usually a liquid monoacrylate monomer having a glass transition temperature below −20° C., and it is used to provide softness at low temperature and also to help dissolve the normally solid diacrylate polyurethanes to provide the coating composition with an appropriate coating viscosity. Liquid diacrylate of the type defined previously may be present to assist the low glass transition temperature monomers to provide good low temperature properties and coating viscosity.

The glass transition temperature of the monomer is the glass transition temperature of a homopolymer of the monomer, and this is a conventional identification of the character of a monomer. Suitable low glass transition temperature monomers are illustrated by ethoxyethoxyethyl acrylate, phenoxyethyl acrylate, butoxyethyl acrylate, 2-hydroxyethyl acrylate, nonyl-substituted phenoxyethyl acrylate, and mixtures thereof.

In this invention it is found that the diacrylate polyurethanes in combination with low glass transition temperature monomer and N-vinyl pyrrolidone cure, on ultraviolet exposure in the presence of appropriate photoinitiators, to provide soft coatings which retain low modulus down to very low temperature. The crystallinity which previously induced microcoating is minimized and effectively eliminated.

As a result, this application provides a buffer coating for optical glass fiber which cures rapidly with ultraviolet exposure, which provides good water resistance, and which combines acceptable room and elevated temperature strength with lower modulus at −60° C. and resistance to crystallinity in order to provide acceptable microbending resistance at low service temperature.

The coating compositions of this invention are intended to be cured with ultraviolet light, so photoinitiators are normally present in an amount of from 0.5% to 8%, preferably from 2% to 5%. These are conventional components of ultraviolet curing ethylenically unsaturated coatings, the usual photoinitiators being ketonic, such as benzophenone, acetophenone, diethoxy acetophenone, m-chloro-acetophenone, propiophenone, thioxanthone, benzoin, benzil, anthraquinone, and the like. A suitable photoinitiator is 2,2-dimethoxy 2-phenyl acetophenone which is available in commerce under the trade designation Irgacure 651. A preferred photoinitiator is the combination of Irgacure 907 (2-methyl-1-[4-(methylthio)phenyl]-2-morpholinopropanone-1 with isopropylthioxanthone. 2,4,6-trimethylbenzoyldiphenyl phosphine oxide is also useful. We can also use Irgacure 184 which is hydroxycyclohexyl phenyl ketone.

These photoinitiators are used alone or in admixture with one another, and amines, like diethyl amine, can be added as photosensitizer, though this is not normally needed.

The coating compositions of this invention are normally free of volatile organic solvents because these would have to be evaporated prior to ultraviolet exposure, which would slow the curing system.

EXAMPLE

Into a reaction vessel fitted with stirrer, a water-cooled condenser, a thermometer and a gas inlet tube are placed 2.2 moles (2200 gms) of polytetramethylene ether glycol (PTMEG) [available from E. I. DuPont de Nemours and Co., Inc. under the trade designation Terathane 1000] and 1 mole of dodecenyl succinic acid. The reaction mixture is heated to about 200° C. with stirring and nitrogen sparging and the reaction is continued for about 12 hours until the acid value is about 1.5. The diester product obtained is subsequently reacted with a diisocyanate in the presence of Desmodur W (from Mobay Chemical Co.) which is a saturated version of methylene diphenyl 4,4'-diisocyanate.

More particularly, Desmodur W is added to the diester reaction product in a molar ratio of 1:2 (the diisocyanate in excess) at 38° C. using a dry nitrogen sparge. The addition of diisocyanate is over a period of 10 minutes using cooling, as needed, to avoid any temperature increase above 40° C. 0.02% of dibutyl tin dilaurate are added to the diester to catalyze the reaction along with 0.1% of phenothiazine, to inhibit oxidation. These proportions are based on the total weight of reactants.

After all the Desmodur W is present, heat is applied to increase the temperature to about 60° C. The viscosity begins to increase, and after 2½ hours stirrability is maintained by adding 7% of total weight of phenoxyethyl acrylate. After 10 minutes hydroxyethyl acrylate is added slowly over 12 minutes and, at this point, the dry nitrogen is replaced by dry air and the heat is controlled at about 60° C. and the NCO content is monitored for the next 8 hours. The reaction is continued until the NCO peak monitored via IR spectrum is no longer observable. Additional phenoxyethyl acrylate is added with stirring to a solids content of 88%, and the reaction product then cools to room temperature. The viscosity of the product is 108,00 centipoises. In a repeat of this example, the viscosity of the product was 148,000 centipoises.

73.7 parts of the above 88% solution is mixed with 4 parts of N-vinyl pyrrolidone, 19 parts of phenoxyethyl acrylate, and 3 parts of (2-methyl-1-[4-(methylthio)-phenyl]-2-morpholinopropanone-1 and 0.3 part of isopropylthioxanthone to be ready for application to optical glass fiber and cure by ultraviolet exposure. It is also preferred to add 1.0% of the weight of the composition of the methacrylate ester of gamma hydroxypropyl trimethoxy silane and 1.0% of the weight of the composition of a fluorocarbon acrylate surfactant to lower surface tension, but these are optional. The viscosity of the coating composition is 13, 220 centipoises.

3 mil coatings were applied to a glass substrate and cured by exposure to ultraviolet light having a wavelength ranging from about 260 to about 380 nanometers. The ultraviolet dose is about 1.0 Joules per square centimeter. The ultraviolet-cured coatings are stripped off the glass substrate and tested by immersion in water for 24 and 48 hours, the coatings being weighed before immersion and after each immersion. The highest weight gain value reached in the two immersions is reported in percent of the initial film and is 0.4% in this example. The water-containing coatings are then dried at room temperature for 5 days and weighed again after drying to find the percent weight loss which indicates how much material was extracted from the original coating by the immersion in water. In this example the weight loss was 0.8%. Adding the two values provides a total weight change of 1.2% from the two experiments which total is referred to as the water sensitivity. Commercial polyurethane polyacrylate buffer coatings for optical glass fiber now in use exhibit a water sensitivity of from 2.0% to 4.0% in the described test, and the lower value reported in this example represents an important improvement.

The cure speed was measured to determine the ultraviolet dosage required to provide a cure which reaches 95% of the final film modulus. In this example the required dosage was 0.2-0.3 Joules per square centimeter. The commercial polyurethane polyacrylate buffer coatings require 1.4 Joules per square centimeter to cure to the same 95% of final film modulus. Faster cure is an added advantage.

The cured film of this example had a very low glass transition temperature (by differential scanning calorimetry) of $-65°$ C. which indicates the absence of crystallinity in the cured coatings of this invention and superior microbending resistance.

Accordingly, this invention provides a significant improvement in resistance to water and microbending resistance. Cure speed is also improved.

The coatings of this invention are applied to freshly drawn optical glass fiber having a diameter of about 125 microns in a thickness of about 125 microns and are cured by passing the coated fiber through two tandemly arranged 10 inch 300 watts medium pressure vapor lamp at 1.5 meters per second.

What is claimed is:

1. An ultraviolet-curable coating composition adapted for the buffer coating of optical glass fiber, consisting essentially of an acrylate-capped polyurethane, which may contain urea groups, in admixture with at least about 25% of the weight of the acrylate-capped polyurethane of liquid monoethylenically unsaturated monomer having a low glass transition temperature below about 0° C., said acrylate-capped polyurethane being based on a generally linear polyurethane which is the reaction product of organic diisocyanate with a stoichiometric deficiency of a modified diol, said modified diol being the diester reaction product of polyoxytetramethylene glycol having a molecular weight of from about 200 to about 2000 with a stoichiometric deficiency of a long chain hydrocarbon-substituted dicarboxylic acid or derivative thereof, said long chain hydrocarbon containing at least 6 carbon atoms and having a molecular weight of up to about 1000 to provide a higher molecular weight polyoxytetramethylene glycol which includes ester groups and a long chain hydrocarbon substituent.

2. An ultraviolet-curable coating composition as recited in claim 1 further including at least 3% of N-vinyl pyrrolidone based on the weight of said low glass transition temperature monomer.

3. An ultraviolet-curable coating composition as recited in claim 1 in which said dicarboxylic acid derivative is succinic acid or anhydride, and said long chain hydrocarbon group has a chain length of from 8 to 16 carbon atoms.

4. An ultraviolet-curable coating composition as recited in claim 1 in which said dicarboxylic acid substitution product is dodecenyl succinic acid or anhydride.

5. An ultraviolet-curable coating composition as recited in claim 1 in which the stoichiometric deficiency of said acid or anhydride is a molar ratio of from about 0.3 to about 0.8 mole of the acid or anhydride per mole of polyoxytetramethylene glycol.

6. An ultraviolet-curable coating composition as recited in claim 5 in which said substituted succinic acid or anhydride is used in a stoichiometric deficiency represented by a molar ratio of from 0.5 to 0.7 mole of said acid or anhydride per mole of polyoxytetramethylene glycol.

7. An ultraviolet-curable coating composition as recited in claim 1 in which said low glass transition temperature monomer is present in an amount of from 30% to 75% of the weight of said acrylate-capped polyurethane.

8. An ultraviolet-curable coating composition as recited in claim 1 in which said N-vinyl pyrrolidone constitutes from 5% to 30% of the weight of said monoethylenically unsaturated liquid component.

9. An ultraviolet-curable coating composition as recited in claim 8 in which said N-vinyl pyrrolidone constitutes from 7% to 25% of the weight of said monoethylenically unsaturated liquid component.

10. An ultraviolet-curable coating composition as recited in claim 1 in which a liquid linear aliphatic diacrylate in which the two acrylate groups are separated by a chain of at least six carbon atoms or a molecular weight of from about 400 to about 4000 is also present in an amount of from 5% to 30% of the total weight of the composition.

11. An ultraviolet-curable coating composition as recited in claim 10 in which said liquid linear aliphatic diacrylate is present in an amount of from 10% to 25% of the weight of the composition.

12. An ultraviolet-curable coating composition as recited in claim 1 in which said polyurethane consists of the reaction product of organic diisocyanate with a stoichiometric deficiency of said modified diol.

13. An ultraviolet-curable coating composition as recited in claim 1 in which said polyurethane contains less than 10% of trifunctional component based on the total weight of difunctional reactants in said polyurethane.

14. An ultraviolet-curable coating composition as recited in claim 1 in which said polyurethane is capped with 2-hydroxyethyl acrylate.

15. An ultraviolet-curable coating composition as recited in claim 1 in which said composition includes from 0.5% to 8% of a ketonic photoinitiator.

16. An ultraviolet-curable coating composition as recited in claim 1 in which said low glass transition temperature monomers are acrylate ethers having a glass transition temperture below −20° C.

17. An ultraviolet-curable coating composition as recited in claim 16 in which said low glass transition temperature monomers are selected from the group consisting of ethoxyethoxyethyl acrylate, phenoxyethyl acrylate, hydrocarbon-substituted phenoxyethyl acrylate, butoxyethyl acrylate, 2-hydroxyethyl acrylate, and mixtures thereof.

18. An ultraviolet-curable coating composition as recited in claim 16 in which said low glass transition temperature monomer is phenoxyethyl acrylate.

19. An optical glass fiber buffer coated with an ultraviolet-cured coating of the coating composition of claim 1.

* * * * *

UNITED STATES PATENT AND TRADEMARK OFFICE
CERTIFICATE OF CORRECTION

PATENT NO. : 4,782,129
DATED : November 1, 1988
INVENTOR(S) : Elias P. Moschovis et al.

It is certified that error appears in the above-identified patent and that said Letters Patent is hereby corrected as shown below:

Column 3, line 27, "sot he" should read: --so the--; and

Column 3, line 41, "100" should read: --1000--.

Signed and Sealed this

Seventh Day of March, 1989

Attest:

DONALD J. QUIGG

Attesting Officer

Commissioner of Patents and Trademarks